US010609368B2

(12) United States Patent
Werner et al.

(10) Patent No.: US 10,609,368 B2
(45) Date of Patent: *Mar. 31, 2020

(54) MULTIPLE IMAGE STORAGE COMPRESSION TREE

(71) Applicant: International Business Machines Corporation, Armonk, NY (US)

(72) Inventors: John Werner, Fishkill, NY (US); Arkadiy Tsfasman, Wappingers Falls, NY (US); Gary Chernega, Dutchess, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,881

(22) Filed: Nov. 13, 2017

(65) Prior Publication Data

US 2018/0376140 A1 Dec. 27, 2018

Related U.S. Application Data

(63) Continuation of application No. 15/630,262, filed on Jun. 22, 2017, now Pat. No. 10,298,925.

(51) Int. Cl.
*H04N 19/114* (2014.01)
*H04N 1/417* (2006.01)
*H04N 19/172* (2014.01)
*H04N 19/96* (2014.01)

(52) U.S. Cl.
CPC .......... *H04N 19/114* (2014.11); *H04N 1/417* (2013.01); *H04N 19/172* (2014.11); *H04N 19/96* (2014.11)

(58) Field of Classification Search
CPC .... H04N 19/114; H04N 19/172; H04N 19/96; H04N 1/417
USPC .................................................... 375/240.12
See application file for complete search history.

(56) References Cited

U.S. PATENT DOCUMENTS 8,681,866 B1 * 3/2014 Jia .................. H04N 19/159
 375/240.01
8,861,866 B2 10/2014 Zhang et al.
(Continued)

FOREIGN PATENT DOCUMENTS

WO 2016004006 A1 1/2016

OTHER PUBLICATIONS

Yang Lu et al. Digital photo similarity analysis in frequency domain and photo album compression, MUM'04 Proceedings of the 3rd international conference on Mobile and ubiquitous multimedia. pp. 237-244 (Year: 2004).*

(Continued)

*Primary Examiner* — William C Vaughn, Jr.
*Assistant Examiner* — Naod W Belai
(74) *Attorney, Agent, or Firm* — Peter Edwards

(57) ABSTRACT

A method, system, and computer program product for compressing an image using similar images includes: receiving a first image; storing the first image on a storage server; comparing the first image to one or more stored intra-frames (I-Frames) to determine a similar I-Frame from the one or more stored I-Frames; in response to determining the similar I-Frame, determining that one or more stored predicted frames (P-Frames) reference the similar I-Frame; comparing the first image to the one or more stored P-Frames to determine a similar P-Frame; determining whether the first image meets a P-Frame threshold level for the similar P-Frame; in response to determining that the first image meets the P-Frame threshold level, generating a first P-Frame for the first image using data from the similar P-Frame and data from the similar I-Frame to compress storage space used by the first image on the storage server.

11 Claims, 8 Drawing Sheets

(56) References Cited

U.S. PATENT DOCUMENTS

| | | | |
|---|---|---|---|
| 8,908,058 B2 | 12/2014 | Akeley et al. | |
| 9,020,282 B2 | 4/2015 | Guo et al. | |
| 9,106,977 B2 | 8/2015 | Pace | |
| 9,361,542 B2 | 6/2016 | Chao | |
| 2001/0046263 A1* | 11/2001 | Yamada | H04N 21/6377 |
| | | | 375/240.12 |
| 2014/0269911 A1 | 9/2014 | Kleinpeter, III | |
| 2015/0023429 A1 | 1/2015 | Narayanan et al. | |
| 2015/0379330 A1 | 12/2015 | Srinivasan et al. | |
| 2016/0029042 A1 | 1/2016 | Eymery et al. | |
| 2017/0195678 A1* | 7/2017 | Frahm | H04N 19/105 |

OTHER PUBLICATIONS

"Accelerated Examination Support Document," International Business Machines Corporation, dated Feb. 23, 2018, 32 pages.

Werner et al., "Multiple Image Storage Compression Tree," U.S. Appl. No. 15/630,262, filed Jun. 22, 2017.

Werner et al., "Multiple Image Storage Compression Tree," U.S. Appl. No. 15/904,517, filed Feb. 26, 2018.

List of IBM Patents or Patent Applications Treated as Related, dated Feb. 23, 2018, 2 pages.

Disclosed Anonymously, "A new and powerful lossless compression method to compress a group of image files", ip.com, An IP.com Prior Art Database Technical Disclosure, IP.com No. IPCOM000244419D, IP.com Electronic Publication Date: Dec. 10, 2015, 9 pages.

Mell, et al., "The NIST Definition of Cloud Computing," Recommendations of the National Institute of Standards and Technology, US Department of Commerce, NIST Special Publication 800-145, Sep. 2011, 7 pages.

List of Patents or Patent Publications Treated as Related, dated Oct. 19, 2017, 2 pages.

Lu et al., "Digital Photo Similarity Analysis in Frequency Domain and Photo Alum Compression," MUM, Oct. 27-29, 2004, Maryland, USA, Copyright 2004 ACM, 8 pages.

* cited by examiner

MULTIPLE IMAGE STORAGE COMPRESSION TREE

BACKGROUND

The present disclosure relates to storing images, and more specifically to grouping similar images and sharing data between those images to reduce storage space.

Image compression is a type of data compression for digital images that attempts to minimize storage space without visually degrading the images. Typically, image compression may be either lossy or lossless. A lossy compression is an irreversible image compression, therefore the image is not completely recovered after image compression. A lossless compression is a reversible image compression, allowing for the image to be completely recovered after image compression without degrading the image.

SUMMARY

Embodiments of the present disclosure provide a computer-implemented method, system, and computer program product to compress an image using similar images. The method includes receiving a first image. The method may further include storing the first image on a storage server, the storage server storing a plurality of images. The method may further include comparing the first image to one or more stored intra-frames (I-Frames), each of the one or more stored I-Frames corresponding to an image from the plurality of images, to determine a similar I-Frame from the one or more stored I-Frames. The method may further include, in response to determining the similar I-Frame, determining that one or more stored predicted frames (P-Frames) reference the similar I-Frame. The method may further include comparing the first image to the one or more stored P-Frames to determine a similar P-Frame. The method may further include, determining whether the first image meets a P-Frame threshold level for the similar P-Frame. The method may further include, in response to determining that the first image meets the P-Frame threshold level, generating a first P-Frame for the first image using data from the similar P-Frame and data from the similar I-Frame to compress storage space used by the first image on the storage server.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
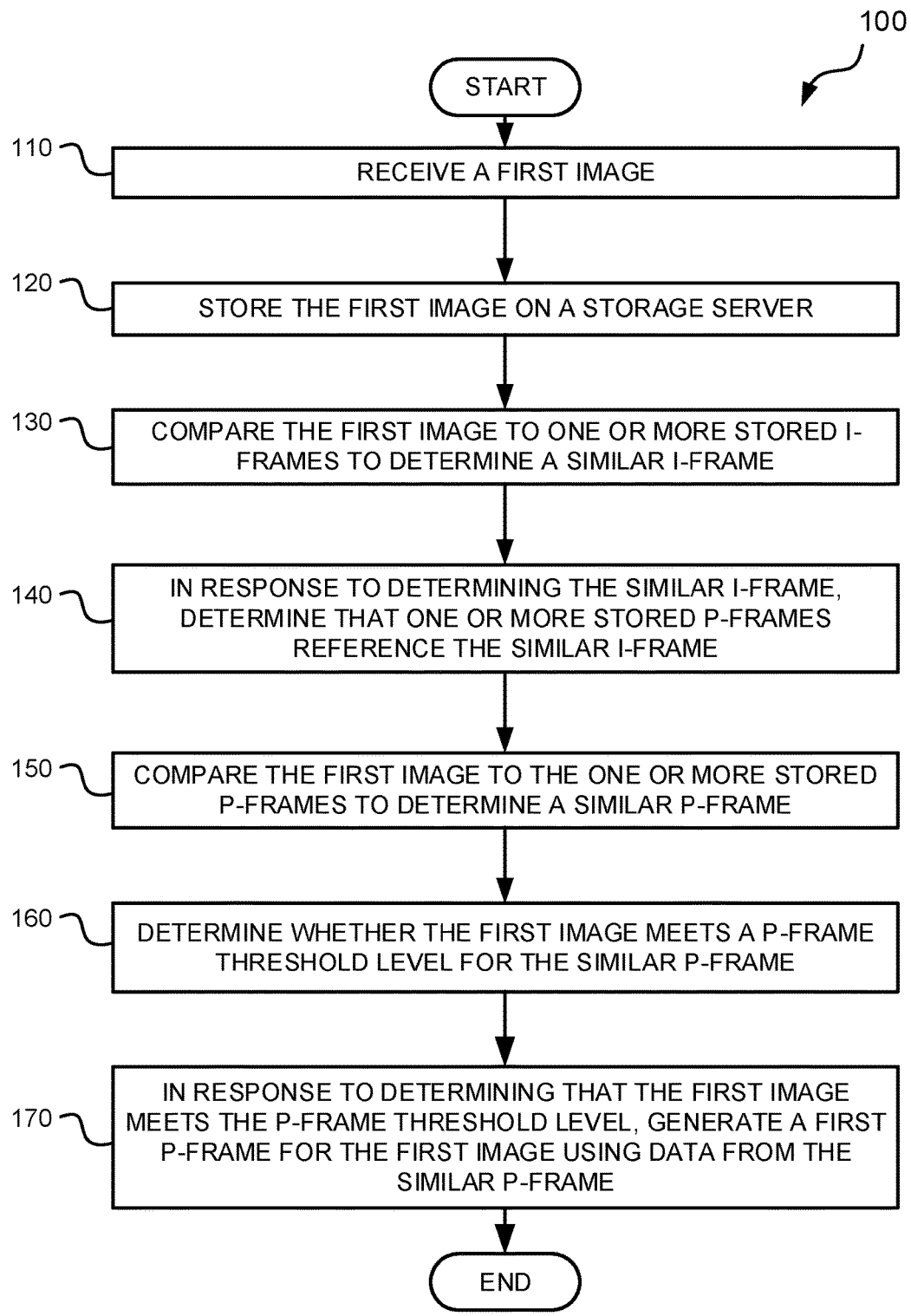
FIG. 1 depicts a flowchart of a set of operations for generating a predicted frame to compress an image, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to image compression, and more specifically to compressing an image using similar images. While the present disclosure is not necessarily limited to such applications, various aspects of the disclosure may be appreciated through a discussion of various examples using this context.

Typically, in order to compress an image enough to significantly reduce the image storage space, the quality of the stored image may be compromised. Lossy compression, for example, may significantly reduce the image storage space but may also degrade the image. Alternatively, lossless compression may not degrade the image, but also may not significantly reduce the image storage space.

Images (e.g., photographs, pictures, etc.) may be frequently uploaded to backend servers and/or cloud servers. Images may also be uploaded to social media applications. Due to the large number of images uploaded to these servers, large amounts of storage space may be necessary to store the images. Typically, many servers compress images on an individual basis to save storage space, but these individual image compressions may degrade the quality of the image (e.g., lossy compression).

The present disclosure provides a computer-implemented method, system, and computer program product to compress and store an image using similar images. The image may share or reference data from the similar image(s), thus resulting in less data stored on the server. This may allow for a significant reduction to the image storage space without degrading the image. Aspects of the present disclosure are directed toward comparing an uploaded image with other images stored on a server to identify similar images. The image most similar to the uploaded image may then be referenced by the uploaded image during image compression, thus reducing the image storage space on a storage server and/or backend server. By referencing the most similar image, the uploaded image may then share data with the most similar image, sometimes multiple similar images, thus reducing storage space. In various embodiments, images from multiple users may be stored on the same storage server. Even though data may be pulled from multiple images to reconstruct an image after compression, a user may not have access to other images used to reconstruct an image. This may allow for privacy and security for the multiple users, as the various users may not view images from the other users. In some embodiments, the storage server that stores the images may be a backend server or a cloud server, allowing for access by multiple users.

In video compression, a video frame may be compressed into an intra-frame (hereinafter, I-Frame), a predicted frame (hereinafter, P-Frame), or a bidirectional predicted frame (hereinafter, B-Frame). A B-Frame may share data with both earlier and later frames, thus reducing the storage space for the video. In video compression, earlier frames may include frames occurring at an earlier time than a current frame (e.g., a frame that was compressed into the B-Frame). Later frames may include frames occurring at a later time than the current frame. A P-Frame may share data with earlier frames, thus again reducing the storage space, although the reduction in storage space may be slightly less than the reduction resulting from a B-Frame compression. An I-Frame typically does not share data with earlier frames, which may lead to a smaller reduction in storage space, compared to the P-Frame and B-Frame.

According to embodiments of the present disclosure, images (e.g., pictures) may be compressed into B-Frames, P-Frames, and I-Frames, in various embodiments. These compressed images, particularly the B-Frames and P-Frames, may reference and share data with other similar compressed images stored on a server, thus reducing the storage space for the image with little to no degradation to the compressed images. By sharing data between images, less data may be needed for each image, and thus less data is stored on the server. The images may include motion vectors and transform coefficients. In various embodiments, the compressed images may be recovered and reconstructed using a lookup table.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources by may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
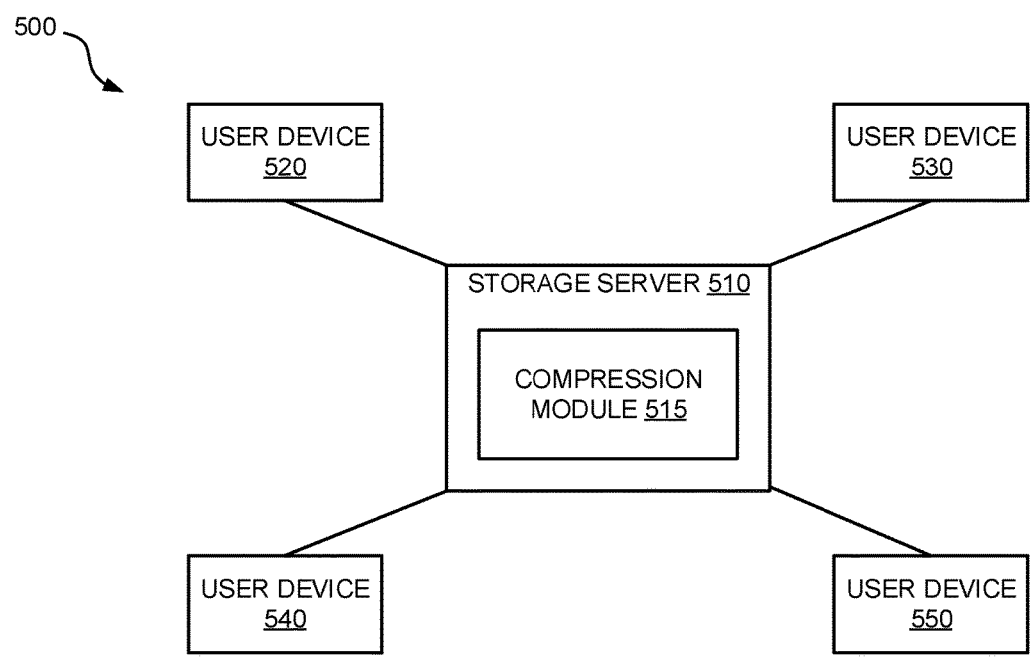
FIG. 5 depicts a block diagram of an example computer system with multiple user devices, according to various embodiments.
Figure 6:
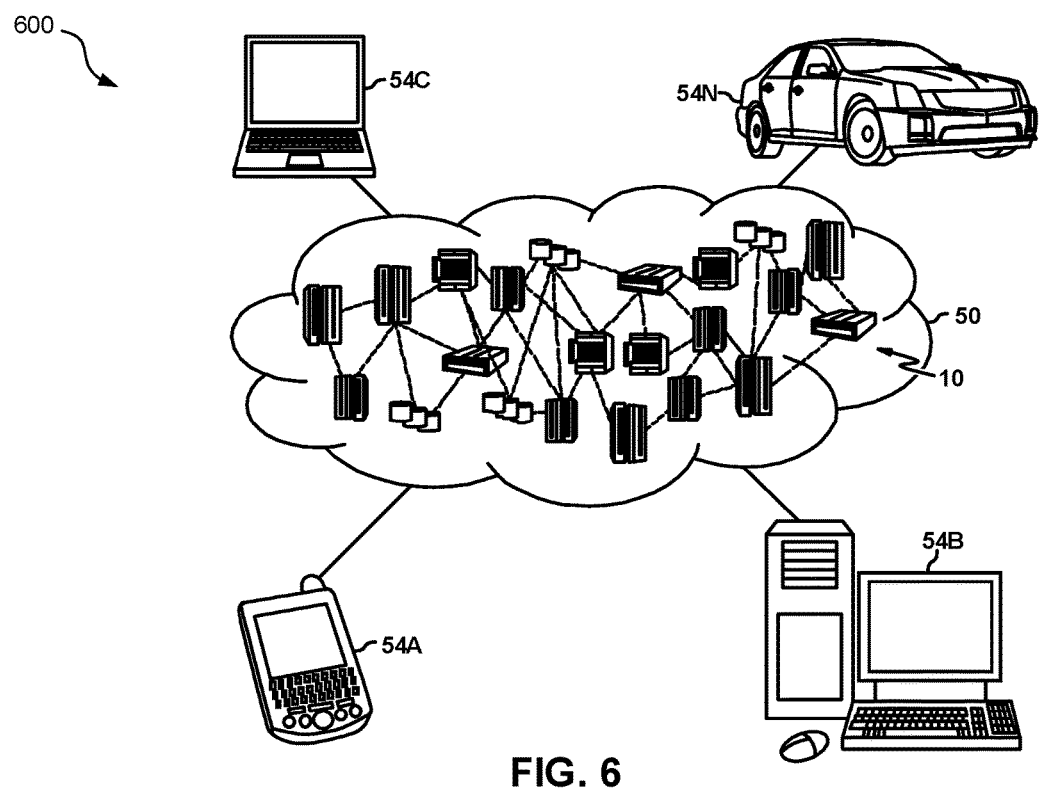
FIG. 6 depicts a cloud computing environment, according to various embodiments.
Figure 8:
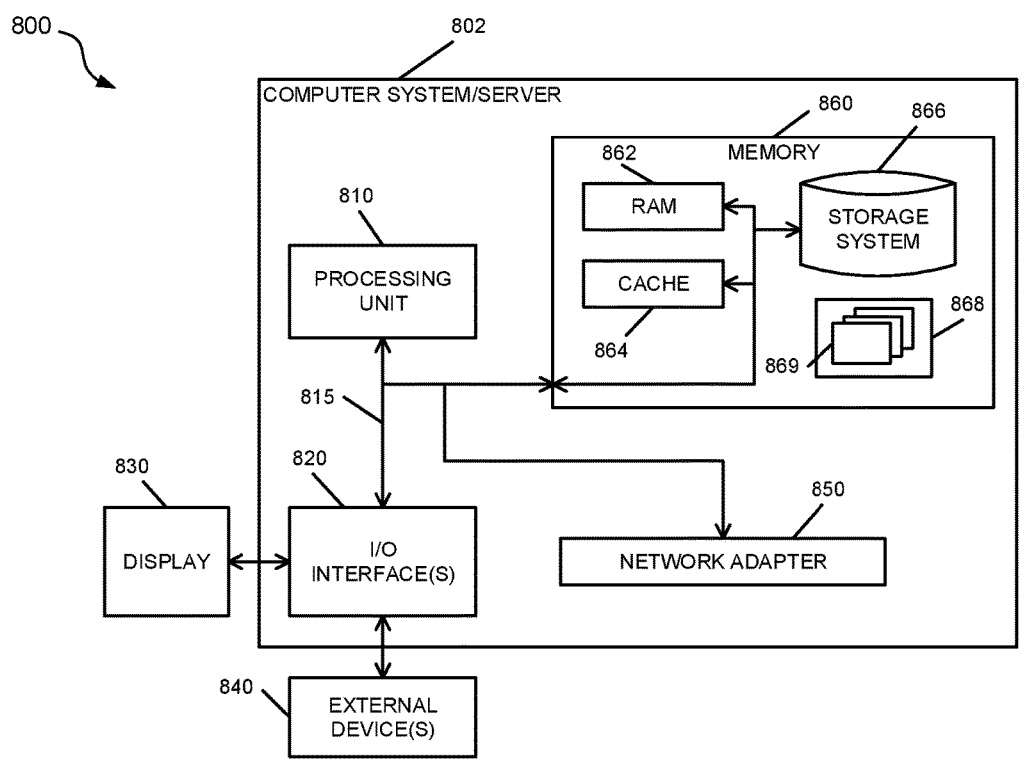
FIG. 8 depicts a sample computer system, according to various embodiments.

Referring now to FIG. 1, a flowchart illustrating a method 100 for generating a P-Frame to compress an image is depicted, according to various embodiments. In an embodiment, the method 100 is implemented as a computer script or computer program (e.g., computer executable code) to be executed by a server, such as storage server 510 (FIG. 5). In various embodiments, the server is a computing device, such as computer system/server 802 (FIG. 8). In some embodiments, the server is a computer program or computer script. In various embodiments, the server is a cloud server in a cloud computing environment, such as cloud computing environment 600 (FIG. 6).

In various embodiments, a server is configured to execute operation 110 to receive a first image. Receiving a first image may include receiving an image uploaded by a user to a storage server. In various embodiments, the first image is uploaded by a user onto social media and thus onto a social networking server. The first image may be uploaded by a user onto a personal computer. In some embodiments, the first image is an uncompressed image. The first image may be a compressed image uploaded for further compression. In various embodiments, the first image is received from a user device, such as user device 520, user device 530, user device 540, and/or user device 550 (FIG. 5), the user device(s) being computing devices.

A server may be configured to execute operation 120 to store the first image on a storage server. In various embodiments, the storage server is a backend server and/or a cloud server. A cloud server may be within a cloud computing environment, such as cloud computing environment 600 (FIG. 6). The storage server may be a storage server such as storage server 510 (FIG. 5), in various embodiments. The storage server may store two or more images. The stored images may include images uploaded from two or more users. In some embodiments, the first image is stored as an uncompressed image.

In various embodiments, a server is configured to execute operation 130 to compare the first image to one or more stored I-Frames to determine a similar I-Frame. An I-Frame may be a previously compressed image stored on the server. I-Frames may contain a whole image, and image data, without referencing data from other images. In some embodiments, each of the one or more stored I-Frames corresponds to an image from the images stored on the storage server. The one or more stored I-Frames may be previously uploaded images that have been compressed into one or more I-Frames. In various embodiments, a similar I-Frame is a stored I-Frame (from the one or more stored I-Frames) that has the most similarities to the first image. Similarities may include similar pixel color components, similar image components, similar objects, similar lighting and/or shading, etc.

In various embodiments, comparing a first image to one or more stored I-Frames to determine a similar I-Frame includes determining a similarity value for each of the one or more stored I-Frames, comparing each similarity value to a similarity threshold, and determining whether the similarity value is greater than or equal to the similarity threshold. The similarity value may be a number indicating an amount of similarity, or likeness, between the first image and the stored I-Frame. In various embodiments, the similarity value may be determined using a comparison algorithm. The similarity threshold may be a number indicating a threshold amount of similarity, or likeness, between the first image and the stored I-Frame. In various embodiments, the similarity threshold and the similarity value are percentages. The similarity threshold and the similarity value may be any number indicating an amount of similarity (e.g., decimal, fraction, integer, ratio, etc.). In some embodiments, the similarity threshold is determined or specified by an owner of the server.

In some embodiments, the similarity threshold may be a number indicating a threshold amount of variance, or differences, between the first image and the stored I-Frame. Thus, comparing a first image to one or more stored I-Frames to determine a similar I-Frame may include determining a similarity value for each of the one or more stored I-Frames, comparing each similarity value to a similarity threshold, and determining whether the similarity value is less than or equal to the similarity threshold.

In various embodiments, the lower the similarity threshold, the greater the reduction of storage space necessary to store the first image, but the lesser the quality of the first image. In some embodiments, image tags (e.g., hashtags, location tags, person tags, etc.) are used to help narrow the comparisons. For example, if the first image is an image of the Eiffel Tower, then the first image may be compared to images with a hashtag including "Eiffel Tower." In another example, an image may be an image of Central Park and includes a location tag indicating that the image is from Central Park. In this example, the first image may be compared to images with a location tag of Central Park.

In some embodiments, the server determines that the similarity value is greater than the similarity threshold, thus indicating that the stored I-Frame is a similar I-Frame. A server may determine that the similarity value is equal to the similarity threshold. This may indicate that the stored I-Frame is a similar I-Frame. In various embodiments, if there are two or more similar I-Frames, the most similar I-Frame is determined. Determining the most similar I-Frame may include comparing the similarity values for each of the similar I-Frames to determine the greatest similarity value, indicating the most similarity. The similar I-Frame with the greatest similarity value may be the most similar I-Frame. Alternatively, when the similarity value is an amount of variance, determining the most similar I-Frame may include comparing the similarity values to determine the smallest similarity value, indicating the most similarity. In this embodiment, the similar I-Frame with the smallest similarity value may be the most similar I-Frame.

In some embodiments, the server determines that the similarity value is less than the similarity threshold, thus indicating that the stored I-Frame is not a similar I-Frame. In these embodiments, the server may determine that there is no similar I-Frame. In response to determining that there is no similar I-Frame, the first image may be compressed into a first I-Frame.

In various embodiments, a server is configured to execute operation 140 to, in response to determining the similar I-Frame, determine that one or more stored P-Frames reference the similar I-Frame. Referencing a frame may include sharing data with the frame. A P-Frame referencing an I-Frame, or another frame (e.g., P-Frame, B-Frame), may help minimize the space on a server that is used to store the two frames by sharing data between the images, thus minimizing the storage space for the frame. A P-Frame may be a compressed image that has been compressed into a predicted frame. In some embodiments, determining that a stored P-Frame references an I-Frame includes determining that the stored P-Frame was compressed using data from the I-Frame. A second frame referenced by a first frame (e.g., a P-Frame referenced by an I-Frame) may be referred to as a subset of the first frame. A compression tree, such as compression tree 300 (FIG. 3) and/or compression tree 400 (FIG. 4), may include one or more subsets of images.

In various embodiments, a server is configured to execute operation 150 to compare the first image to the one or more stored P-Frames that reference the same I-Frame to determine a similar P-Frame. A similar P-Frame may be a stored P-Frame (from the one or more stored P-Frames) that has the most similarities to the first image. In various embodiments, comparing a first image to one or more stored P-Frames includes determining a similarity value for each of the one or more stored P-Frames, comparing each similarity value to the similarity threshold (discussed herein), and determining whether the similarity value is greater than the similarity threshold.

In some embodiments, the server determines that the similarity value is greater than the similarity threshold, thus indicating that the stored P-Frame is a similar P-Frame. In various embodiments, if there are two or more similar P-Frames, the most similar P-Frame is determined. Determining the most similar P-Frame may include comparing the similarity values for each of the similar P-Frames to determine the greatest similarity value. The similar P-Frame with the greatest similarity value may be the most similar P-Frame.

In some embodiments, the similarity value is less than the similarity threshold, thus indicating that the stored P-Frame is not a similar P-Frame. In certain embodiments, there may be no similar P-Frame. In response to determining that there is no similar P-Frame, the first image may be compressed into a first P-Frame using data from the similar I-Frame.

In various embodiments, a server is configured to execute operation 160 to determine whether the first image meets a P-Frame threshold level for the similar P-Frame. A P-Frame threshold level may be a threshold level indicating a threshold similarity between the first image and the P-Frame. In some embodiments, the P-Frame threshold level is the similarity threshold. In certain embodiments, the P-Frame threshold level is a threshold value greater than the similarity threshold.

Determining whether the first image meets a P-Frame threshold level may include determining a similarity value between the first image and the similar P-Frame and comparing the similarity value with the P-Frame threshold level. The similarity value may be a number indicating an amount of similarity between the first image and the similar P-Frame. In some embodiments, the similarity value is the same similarity value used to determine a similar P-Frame. In various embodiments, the similarity value and the P-Frame threshold level are percentages. The similarity value and the P-Frame threshold level may include any number indicating an amount of similarity (e.g., decimal, fraction, integer, ratio, etc.).

In some embodiments, the first image does not meet the P-Frame threshold level. In response to determining that the first image does not meet the P-Frame threshold level, a P-Frame may be generated for the image (to compress the image) using data from the similar I-Frame. The generated P-Frame may reference the similar I-Frame. In some embodiments, the first image does meet the P-Frame threshold level.

In various embodiments, a server is configured to execute operation 170 to, in response to determining that the first image meets the P-Frame threshold level, generate a first P-Frame for the first image using data from the similar P-Frame to compress storage space used by the first image on the storage server. In some embodiments, generating a first P-Frame from the first image includes compressing the first image to a first P-Frame. Data from the most similar P-frame that met the P-Frame threshold level may be used, or referenced, by the first P-Frame.

Utilizing the data from the most similar P-frame that met the P-Frame threshold level may help compress storage space used by the first image on the storage server, thus reducing the storage space necessary to store the first image.

In some embodiments, the first P-Frame is generated using data from the similar P-Frame and data from the similar I-Frame. Utilizing the data from the most similar P-Frame and the most similar I-Frame may help further compress storage space used by the first image, because the first image may share data with the P-Frame and the I-Frame, thus reducing the storage space necessary to store the first image.

In various embodiments, the first image may be added to a first subset of images under the most similar P-Frame. A first subset of images may be one or more images that reference the similar P-Frame. In some embodiments, referencing a frame includes sharing data with the frame. For example, if a P-Frame references a second P-Frame, then the P-Frame may share data with the second P-Frame which in turn references data from an I-Frame, allowing for reduced storage space for the P-Frame.

In various embodiments, method 100 further includes determining whether the first image meets a B-Frame threshold level for the similar P-Frame, in response to determining that the first image meets the P-Frame threshold level. The B-Frame threshold level may indicate a threshold amount of similarity between the first image and the similar P-Frame. In various embodiments, the B-Frame threshold level is greater than the P-Frame threshold level. A B-Frame may reference both the similar P-Frame, and a frame at the previous level (e.g., I-Frame, P-Frame).

In various embodiments, determining whether the first image meets a B-Frame threshold level includes determining a similarity value between the first image and the similar P-Frame, and comparing the similarity value with the B-Frame threshold level. In various embodiments, the B-Frame threshold level is a percentage. In some embodiments, the B-Frame threshold level includes any number indicating an amount of similarity (e.g., decimal, fraction, integer, ratio, etc.).

In some embodiments, the server determines that the first image does not meet the B-Frame threshold level. In response to determining that the first image does not meet the B-Frame threshold level, a P-Frame may be generated for the first image. In some embodiments, the P-Frame is generated, or the image is compressed to a P-Frame, using the similar P-Frame. In some embodiments, the P-Frame is generated, or the image is compressed to a P-Frame, using the similar I-Frame. In various embodiments, the server determines that the first image meets the B-Frame threshold level.

In various embodiments, method 100 further includes, in response to determining that the first image meets the B-Frame threshold level, generating a first B-Frame for the first image. In some embodiments, the B-Frame is generated, or the image is compressed to a B-Frame, using data from the similar P-Frame and data from the similar I-Frame. In certain embodiments, the B-Frame is generated using data from the similar P-Frame and data from an image at a previous level. Data at a previous level may include data for a frame that is referenced by the similar P-Frame. B-Frame compression may be the highest compression level, and may indicate that the image is very similar to an existing P-Frame and is also very similar to an image at the previous level. Because the B-Frame compression may reference multiple levels of compressed images, the compressed image (using B-Frame compression) may need a minimal amount of storage space on a storage server, thus significantly reducing the storage size for the image.

In various embodiments, the first image may be compressed after being stored on a server for a predetermined time threshold. A time threshold may be a threshold amount of time (e.g., hours, minutes, days, seconds, etc.) or a specific time (e.g., 12:00 PM). This may allow users or friends of users on social media to view an uncompressed image within a time duration following the initial upload.

Figure 2:
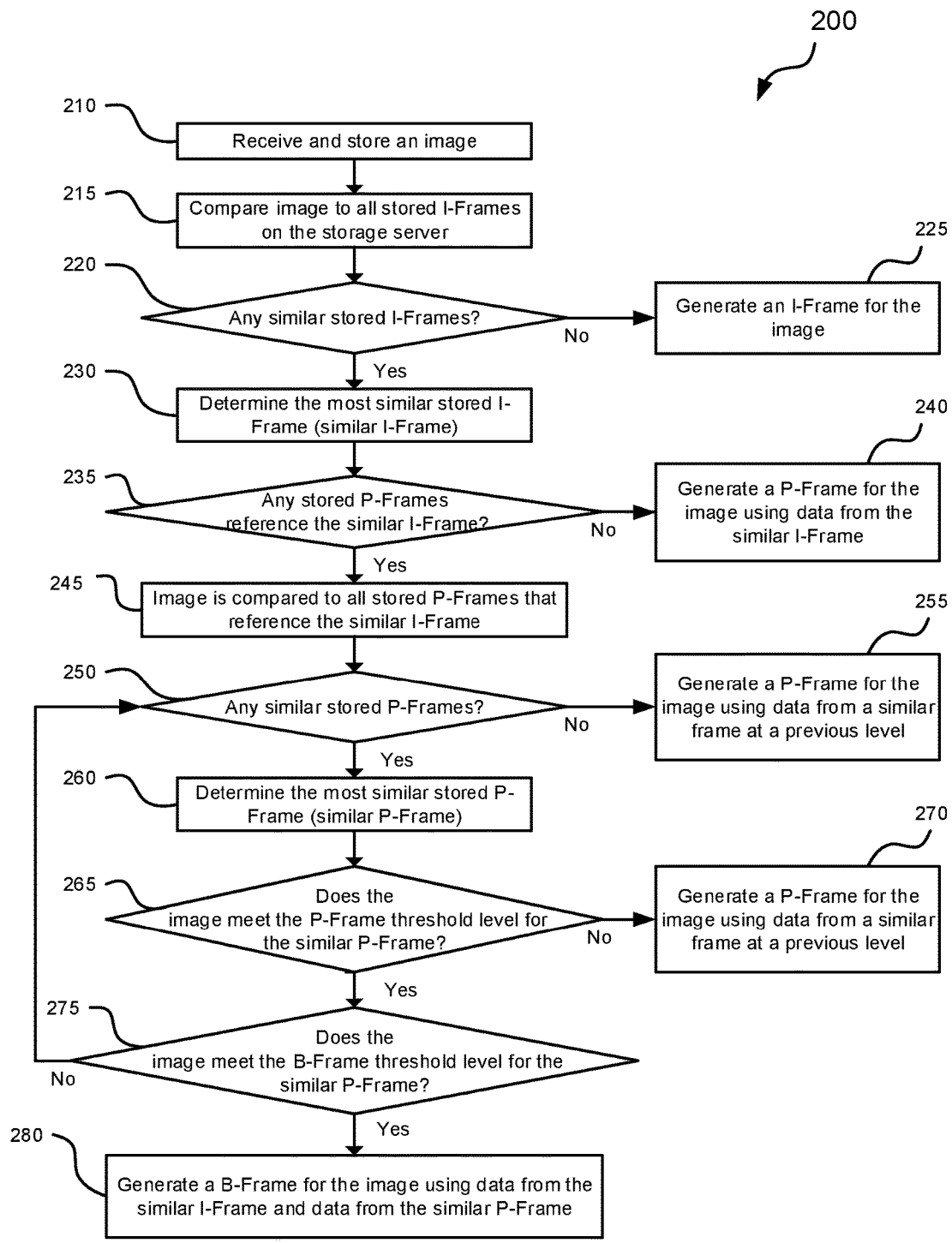
FIG. 2 depicts a flowchart for compressing an image, according to various embodiments.

Referring to FIG. 2, a flowchart illustrating a method 200 for compressing an image is depicted, according to various embodiments. In an embodiment, the method 200 is implemented in a computer script or computer program (e.g., computer executable code) to be executed by a server, such as storage server 510 (FIG. 5). In various embodiments, the server is a computer device, such as computer system/server 802 (FIG. 8). In some embodiments, the server is a computer program or computer script. The server may be a cloud server in a cloud computing environment, such as cloud computing environment 600 (FIG. 6).

In various embodiments, a server is configured to execute operation 210 to receive and store an image. A server may be configured to execute operation 215 to compare the image to a set of I-Frames stored on the storage server. At operation 220 the server may determine if there are any similar stored I-Frames. In various embodiments, a server is configured to execute operation 225 to generate an I-Frame for the image, when the server determines that there are no similar I-Frames. In various embodiments, the server is configured to execute operation 230 to determine the most similar stored I-Frame (similar I-Frame), when there are one or more similar I-Frames.

In response to determining the most similar I-Frame, the server may be configured to execute operation 235 to determine if there are any stored P-Frames that reference the similar I-Frame. In various embodiments, a server is configured to execute operation 240 to generate a P-Frame for the image using data from the similar I-Frame, when there are no stored P-Frames that reference the similar I-Frame. For example, when there are no stored P-Frames that reference the similar I-Frame, the image may be compressed as a P-Frame using data from the I-Frame. In some embodiments, a server is configured to execute operation 245 to compare the image to all the stored P-Frames that reference the similar I-Frame, when there are one or more stored P-Frames that reference the similar I-Frame.

At operation 250, the server may determine if there are any similar stored P-Frames. In response to determining that there are no similar P-Frames, the server may execute operation 255 to compress the image as a P-Frame using data from the similar frame at a previous level (e.g., I-Frame or P-Frame). A previous level may include images on a lower, or previous, compression level than the current image. In some embodiments, a previous level includes frames that are referenced by the current image. Levels are further discussed herein. In various embodiments, the server may execute operation 260 to determine the most similar stored P-Frame (similar P-Frame) when there are one or more similar P-Frames.

At operation 265, the server may determine if the image meets the P-Frame threshold level for the similar P-Frame. The server may execute operation 270 to compress the image as a P-Frame using data from a similar frame at a previous level, when the image does not meet the P-Frame threshold level. In some embodiments, when the image meets the P-frame threshold level, the server executes operation 275 to determine if the image meets the B-Frame threshold level for the similar P-Frame.

In response to determining that the image does not meet the B-Frame threshold, the server may return to operation 250 to determine if there are any similar stored P-Frames. In some embodiments, the server checks for similar P-Frames at a later level. In other words, when the image does not meet the B-Frame threshold, the image may be stored deeper within the storage tree.

In response to determining that the image meets the B-Frame threshold, the server may execute operation 280 to generate a B-Frame for the image, or compress the image as a B-Frame. Data from the similar frame at the previous level (e.g., I-Frame or P-Frame) and data from the similar P-Frame may be used to compress the image as a B-Frame.

Figure 3:
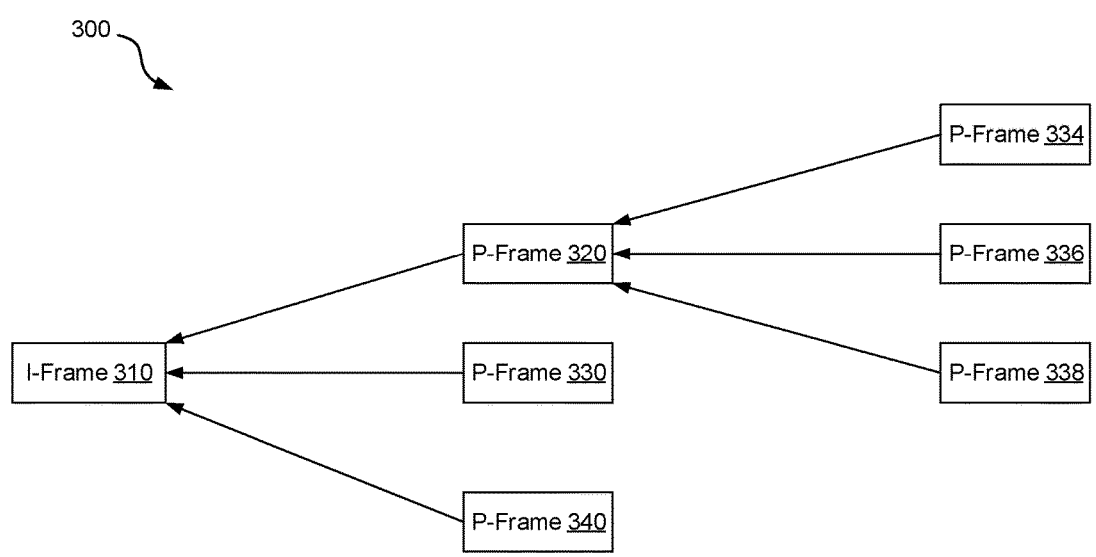
FIG. 3 depicts a block diagram of an example of a compression tree, according to various embodiments.

Referring to FIG. 3, a block diagram of a sample compression tree 300 is depicted, according to various embodiments. Compression tree 300 is one possible scenario illustrating image subsets and referenced images, and is illustrated for example purposes.

In various embodiments, compression tree 300 includes I-Frame 310, P-Frame 320, P-Frame 330, and P-Frame 340. P-Frame 320, P-Frame 330, and P-Frame 340 reference data from I-Frame 310, in the compression tree 300. In some embodiments, compression tree 300 includes P-Frame 334, P-Frame 336, and P-Frame 338. P-Frame 334, P-Frame 336, and P-Frame 338 all reference P-Frame 320, in the compression tree 300. In various embodiments, P-Frame 334, P-Frame 336, and P-Frame 338 make up a subset of images, where the subset references data from P-Frame 320. In turn, P-Frame 320 may reference data from I-Frame 310, as discussed herein. For example, if P-Frame 334 were to be reconstructed into its full image, P-Frame 334 would be reconstructed using data from P-Frame 320 and data from I-Frame 310.

Figure 4:
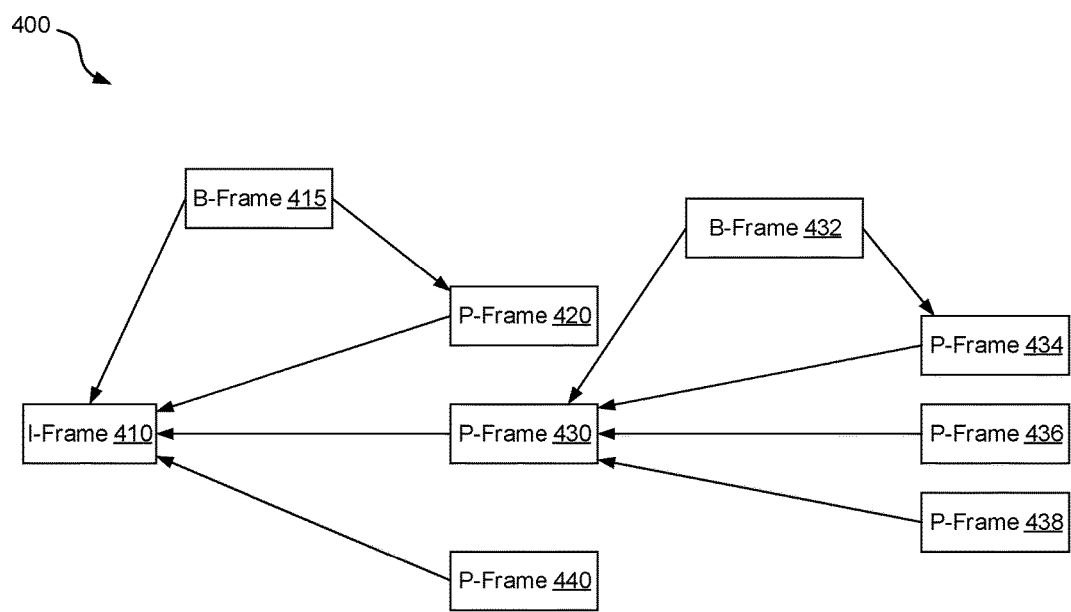
FIG. 4 depicts a block diagram of an example of a compression tree including B-Frames, according to various embodiments.

Referring to FIG. 4, a block diagram of a sample compression tree 400 is depicted, according to various embodiments. Compression tree 400 is one possible scenario illustrating image subsets and referenced images, and is illustrated for example purposes.

In various embodiments, compression tree 400 includes I-Frame 410, P-Frame 420, P-Frame 430, P-Frame 440, and B-Frame 415. P-Frame 420, P-Frame 430, and P-Frame 440 all reference I-Frame 410, in compression tree 400. The arrows on FIG. 4 may depict the different data references between images or frames. B-Frame 415 may reference I-Frame 410 and P-Frame 420. In some embodiments, separate the compression tree 400 includes P-Frame 434, P-Frame 436, P-Frame 438, and B-Frame 432. P-Frame 434, P-Frame 436, and P-Frame 438 all reference P-Frame 430, in the compression tree 400. B-Frame 432 may reference both P-Frame 430 and P-Frame 434. For example, if B-Frame 432 were to be reconstructed into its full image, B-Frame would be reconstructed using data from P-Frame 434, P-Frame 430, and I-Frame 410. As another example, P-Frame 436 would be reconstructed into its full image using data from P-Frame 430 and I-Frame 410. As another example, P-Frame 420 would be reconstructed into its full image using data from I-frame 410. Alternatively, as another example, B-Frame 415 would be reconstructed into its full image using data from P-Frame 420 and I-Frame 410.

In various embodiments, P-Frame 434, P-Frame 436, and P-Frame 438 are a first level of images. P-Frame 420, P-Frame 430, and P-Frame 440 may be a second level of images that is previous to the first level of images. I-Frame 410 may be a third level of images that is previous to the second level of images. In some embodiments, B-Frame 415 is a fourth level of images, the fourth level of images between the second level and the first level. In certain embodiments, B-Frame 432 is a fifth level of images, the fifth level subsequent to, or later than, the first level. These data references between frames may be referred to as nesting, herein. The nesting may correspond to the various image levels. In various embodiments, the image frames may be nested into further levels. In some embodiments, the further nested an image is (e.g., the more frames an image references) the more time it may take to reconstruct an image, but the more storage space the image saves on the server.

Referring to FIG. 5, a block diagram of a sample computer system 500 with multiple user devices is depicted, according to various embodiments. System 500 is one possible computer system capable of compressing an image using similar images, and is illustrated for example purposes.

In various embodiments, system 500 includes a storage server 510, user device 520, user device 530, user device 540, and user device 550, the user devices being computing devices. In some embodiments, user devices 520, 530, 540, and 550 correspond to different users. The storage server 510 may receive images from the user devices 520, 530, 540, and 550. In various embodiments, storage server 510 executes the operations 110-180, discussed herein and depicted in FIG. 1. In some embodiments, storage server 510 executes the operations 210-280, discussed herein and depicted in FIG. 2.

In various embodiments, storage server 510 includes a compression module 515. The compression module may execute operations 110-180 and/or operations 210-280, in various embodiments.

Referring to FIG. 6, an illustrative cloud computing environment 600 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
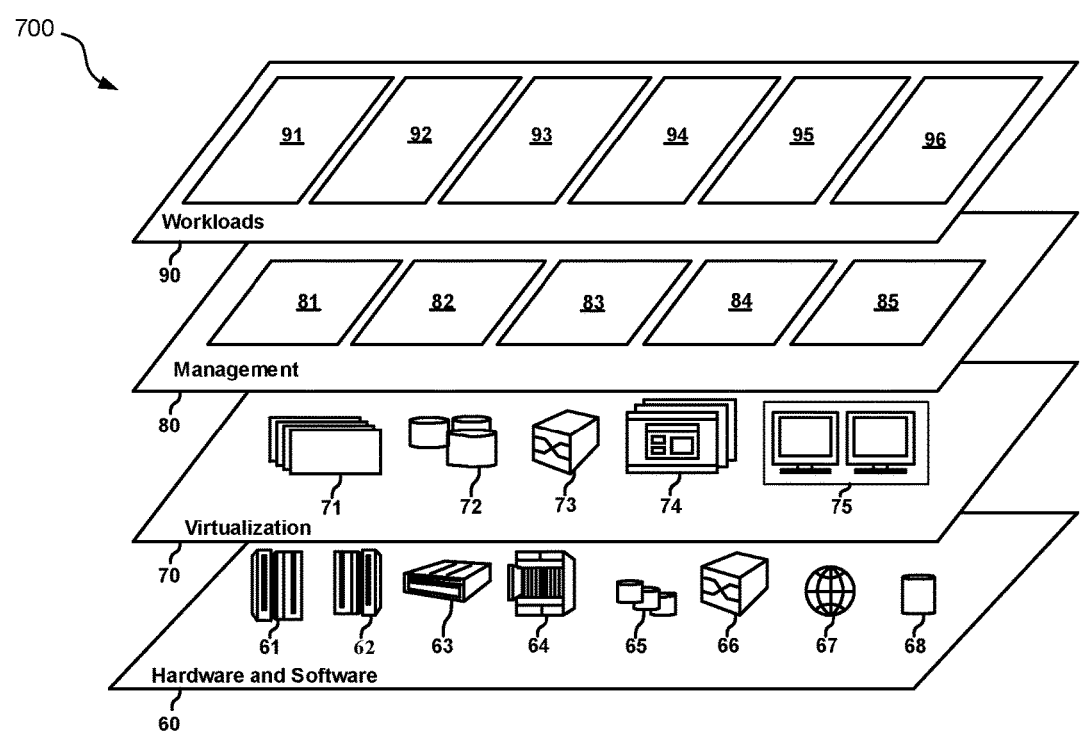
FIG. 7 depicts abstraction model layers, according to various embodiments.

Referring to FIG. 7, a set of functional abstraction layers 700 provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image compression 96.

Referring now to FIG. 8, computer system 800 is a computer system/server 802 is shown in the form of a general-purpose computing device, according to various embodiments. The components of computer system/server 802 may include, but are not limited to, one or more processors or processing units 810, a system memory 860, and a bus 815 that couple various system components including system memory 860 to processor 810.

Bus 815 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 860 can include computer system readable media in the form of volatile memory, such as random access memory (RAM) 862 and/or cache memory 864. Computer system/server 802 may further include other removable/non-removable, volatile/non-volatile computer system storage media. By way of example only, storage system 866 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 815 by one or more data media interfaces. As will be further depicted and described below, memory 860 may include at least one program product having a set (e.g., at least one) of program modules that are configured to carry out the functions of embodiments of the invention.

Program/utility 868, having a set (at least one) of program modules 869, may be stored in memory 860 by way of example, and not limitation, as well as an operating system, one or more application programs, other program modules, and program data. Each of the operating system, one or more application programs, other program modules, and program data or some combination thereof, may include an implementation of a networking environment. Program modules 869 generally carry out the functions and/or methodologies of embodiments of the invention as described herein.

Computer system/server 802 may also communicate with one or more external devices 840 such as a keyboard, a pointing device, a display 830, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 820. Still yet, computer system/server 802 can communicate with one or more networks such as a local area network (LAN), a general wide area network (WAN), and/or a public network (e.g., the Internet) via network adapter 850. As depicted, network adapter 850 communicates with the other components of computer system/server 802 via bus 815. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a first image;
   storing the first image on a storage server, the storage server storing a plurality of images;
   comparing the first image to one or more stored intra-frames (I-Frames), each of the one or more stored I-Frames corresponding to an image from the plurality of images, to determine a similar I-Frame from the one or more stored I-Frames;
   in response to determining the similar I-Frame, determining that one or more stored predicted frames (P-Frames) reference the similar I-Frame;
   comparing the first image to the one or more stored P-Frames to determine a similar P-Frame;
   determining whether the first image meets a P-Frame threshold level for the similar P-Frame;
   in response to determining that the first image meets the P-Frame threshold level, determining whether the first image meets a bidirectional predicted frame (B-Frame) threshold level for the similar P-Frame; and
   in response to determining that the first image meets the B-Frame threshold level, generating a first B Frame for the first image using data from the similar P-Frame, data from a similar frame at a previous level, and data from the similar I-Frame to compress storage space used by the first image on the storage server.

2. The method of claim 1, wherein determining whether the first image meets a P-Frame threshold level comprises:
   determining a similarity value between the first image and the similar P-Frame, wherein the similarity value is a number indicating an amount of similarity between the first image and the similar P-Frame; and
   comparing the similarity value with the P-Frame threshold level, wherein the P-Frame threshold level is a number indicating a threshold amount of similarity between the first image and the similar P-Frame.

3. The method of claim 2, wherein the similarity value and the P-Frame threshold level are percentages.

4. The method of claim 1, further comprising:
   in response to determining that the first image does not meet the B-Frame threshold level, generating the first P-Frame for the first image.

5. The method of claim 1, wherein the B-Frame threshold level is greater than the P-Frame threshold level.

6. The method of claim 1, wherein determining whether the first image meets a B-Frame threshold level comprises:
   determining a similarity value between the first image and the similar P-Frame, wherein the similarity value is a number indicating an amount of similarity between the first image and the similar P-Frame; and
   comparing the similarity value with the B-Frame threshold level, wherein the B-Frame threshold level is a number indicating a threshold amount of similarity between the first image and the similar P-Frame.

7. The method of claim 6, wherein the similarity value and the B-Frame threshold level are percentages.

8. The method of claim 1, further comprising:
   in response to determining that the first image does not meet the P-Frame threshold level, generating the first P-Frame for the first image using data from a similar frame at a previous level.

9. The method of claim 1, wherein the first image is an uncompressed image.

10. The method of claim 1, wherein the first image is a compressed image.

11. The method of claim 1, wherein the storage server is a cloud server.

* * * * *